US011201686B1

(12) United States Patent
Ritter et al.

(10) Patent No.: US 11,201,686 B1
(45) Date of Patent: Dec. 14, 2021

(54) OPTICALLY MULTIPLEXED QUANTUM CONTROL

(71) Applicant: INTERNATIONAL BUSINESS MACHINES CORPORATION, Armonk, NY (US)

(72) Inventors: Mark B. Ritter, Sherman, CT (US); Jason S. Orcutt, Katonah, NY (US); Patryk Gumann, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/021,683

(22) Filed: Sep. 15, 2020

(51) Int. Cl.
*H04J 14/02* (2006.01)
*G06N 10/00* (2019.01)
*H04B 10/66* (2013.01)
*H04B 10/516* (2013.01)

(52) U.S. Cl.
CPC .............. *H04J 14/02* (2013.01); *G06N 10/00* (2019.01); *H04B 10/516* (2013.01); *H04B 10/66* (2013.01)

(58) Field of Classification Search
CPC ................................ H04J 14/02; G06N 10/00
See application file for complete search history.

(56) References Cited

U.S. PATENT DOCUMENTS 6,897,434 B1 5/2005 Kumar et al.
7,636,522 B2 12/2009 Nagarajan et al.
8,787,410 B2 7/2014 Fermann
9,401,766 B2 7/2016 Yuan et al.
9,787,409 B1 10/2017 Ladd
10,097,281 B1 10/2018 Vernik et al.
2016/0267032 A1* 9/2016 Rigetti ................ G06F 13/4068
2020/0410343 A1* 12/2020 Niu ........................ G06N 10/00

FOREIGN PATENT DOCUMENTS

WO 2018050948 A1 3/2018

OTHER PUBLICATIONS

Gambetta et al., "Building logical qubits in a superconducting quantum computing system", nature partner journals, 2017 (Year: 2017).*

(Continued)

*Primary Examiner* — Shi K Li
(74) *Attorney, Agent, or Firm* — Venable LLP; Henry J. Daley (57) ABSTRACT

A qubit control system for a quantum computer includes a source of a plurality optical carriers; an optical modulator to receive the plurality optical carriers and to modulate each optical carrier with a qubit control signal to provide a plurality of modulated optical signals; an optical multiplexer to provide a wavelength division multiplexed optical signal; an optical waveguide to receive and transmit the wavelength division multiplexed optical signal therethrough; an optical demultiplexer to receive the wavelength division multiplexed optical signal to recover each of the plurality of modulated optical signals; a demodulator to receive each of the recovered plurality of modulated optical signals to output a corresponding plurality of recovered qubit control signals to control subsets of a plurality of qubits.

25 Claims, 3 Drawing Sheets

(56) References Cited

OTHER PUBLICATIONS

Heinsoo et al., "Rapid high-fidelity multiplexed readout of superconducting qubits", Phys. Rev. Applied 10, 034040 (2018); arXiv:1801.07904v1 [quant-ph] Jan. 24, 2018.
Krinner et al., "Engineering cryogenic setups for 100-qubit scale superconducting circuit systems", EPJ Quantum Technology (2019) 6:2; https://doi.org/10.1140/epjqt/s40507-019-0072-0.
Lin et al., "Low noise optical multi-carrier generation using optical-FIR filter for ASE noise suppression in recirculating frequency shifter loop", Optics Express, vol. 22, Issue 7, pp. 7852-7864 (2014),<https://doi.org/10.1364/OE.22.007852>.
Https://www.innolume.com/wp-content/uploads/2021/05/LD-1310-COMB-8.pdf.

* cited by examiner

OPTICALLY MULTIPLEXED QUANTUM CONTROL

BACKGROUND

The currently claimed embodiments of the present invention relate to quantum computation, and more specifically, to a qubit control system for a quantum computer and a method of controlling qubits in a quantum computer.

One building block in quantum computing is to be able to prepare qubits in specific quantum states. Qubits in a superconducting quantum computer are usually controlled using radio frequency energy. The radio frequency is delivered via a radio frequency line to a resonator which in turn interacts with the qubit to control the quantum states of the qubit.

The number of control radio frequency lines can scale with the number of qubits in a quantum computer. At very large numbers of qubits, the number of radio frequency lines can become also very large. In order to reduce the number of lines used, it may be desirable to employ multiplexers and demultiplexers to be able to send a plurality of radio frequency energy signals to the plurality of qubits. However, even when using multiplexers and demultiplexers to transmit radio frequency energy signals, a problem remains that these types of systems are bulky, and more importantly introduce heat and associated noise into the superconducting environment of the qubits. Therefore, it is desirable to solve this and other problems of existing signal transport techniques.

SUMMARY

An aspect of the present invention is to provide a qubit control system for a quantum computer. The qubit control system includes a source of a plurality optical carriers, each optical carrier being a different wavelength of light; and an optical modulator configured to receive the plurality optical carriers and to modulate each optical carrier with a qubit control signal to provide a plurality of modulated optical signals. The qubit control system also includes an optical multiplexer configured to receive the plurality of modulated optical signals and provide a wavelength division multiplexed optical signal; and an optical waveguide optically coupled to the optical multiplexer to receive and transmit the wavelength division multiplexed optical signal therethrough. The qubit control system further includes an optical demultiplexer optically coupled to the optical waveguide to receive the wavelength division multiplexed optical signal after being transmitted through the optical waveguide to recover each of the plurality of modulated optical signals; a demodulator optically coupled to the optical demultiplexer to receive each of the recovered plurality of modulated optical signals to output a corresponding plurality of recovered qubit control signals; and a plurality of spatially separated qubit-control waveguides each configured to receive at least one of the plurality of recovered qubit control signals such that equivalent recovered qubit control signals are spatially divided into different spatially separated qubit-control waveguides. Each of the plurality of spatially separated qubit-control waveguides directs qubit control signals to a different subset of a plurality of qubits, the plurality of qubits being configured to be controlled by the qubit control signals delivered by the plurality of spatially separated qubit-control waveguides.

In an embodiment, the plurality of qubit control signals and corresponding the plurality of recovered qubit control signals are in radio frequency (RF) wavelength ranges corresponding to an excitation energy of a corresponding qubit to be controlled.

In an embodiment, the qubit control system further includes a radio frequency multiplexer configured to receive at least two recovered qubit control signals that are different RF wavelengths from the demodulator and to multiplex the at least two recovered qubit control signals onto one of the plurality of spatially separated qubit-control waveguides.

In an embodiment, the qubit control system further includes a plurality of radio frequency multiplexers each configured to receive at least two recovered qubit control signals that are different RF wavelengths from the demodulator and to multiplex the at least two recovered qubit control signals onto a corresponding one of the plurality of spatially separated qubit-control waveguides.

In an embodiment, the radio frequency multiplexer includes a plurality of bandpass filters each allowing a corresponding one recovered qubit control signal to pass while attenuating or substantially blocking all other recovered qubit control signals. In an embodiment, the demodulator includes a direct optical to electrical converter.

Another aspect of the present invention is to provide a quantum computer including a refrigeration system having a temperature-controlled vessel; a quantum processor disposed within the temperature-controlled vessel, the quantum processor including a plurality of qubits; and a qubit control system having a portion exterior to the temperature-controlled vessel and a portion extending into the temperature-controlled vessel to provide control of the plurality of qubits. The qubit control system includes a source of a plurality optical carriers, each optical carrier being a different wavelength of light; an optical modulator configured to receive the plurality optical carriers and to modulate each optical carrier with a qubit control signal to provide a plurality of modulated optical signals; an optical multiplexer configured to receive the plurality of modulated optical signals and provide a wavelength division multiplexed optical signal; an optical waveguide optically coupled to the optical multiplexer to receive and transmit the wavelength division multiplexed optical signal therethrough; an optical demultiplexer optically coupled to the optical waveguide to receive the wavelength division multiplexed optical signal after being transmitted through the optical waveguide to recover each of the plurality of modulated optical signals; a demodulator optically coupled to the optical demultiplexer to receive each of the recovered plurality of modulated optical signals to output a corresponding plurality of recovered qubit control signals; and a plurality of spatially separated qubit-control waveguides each configured to receive at least one of the plurality of recovered qubit control signals such that equivalent recovered qubit control signals are spatially divided into different spatially separated qubit-control waveguides. Each of the plurality of spatially separated qubit-control waveguides directs qubit control signals to a different subset of the plurality of qubits, the plurality of qubits being configured to be controlled by the qubit control signals delivered by the plurality of spatially separated qubit-control waveguides.

In an embodiment, the source of the plurality optical carriers, the optical modulator, and the optical multiplexer are all disposed external to the temperature-controlled vessel. In an embodiment, the optical demultiplexer and the demodulator are disposed within the temperature-controlled vessel. In an embodiment, the optical waveguide extends from the optical multiplexer that is disposed external to the temperature-controlled vessel into the temperature-controlled vessel to the optical demultiplexer. In an embodiment, the plurality of qubit control signals and corresponding the plurality of recovered qubit control signals are in radio frequency (RF) wavelength ranges corresponding to an excitation energy of a corresponding qubit to be controlled.

In an embodiment, the quantum computer further includes a radio frequency multiplexer configured to receive at least two recovered qubit control signals that are different RF wavelengths from the demodulator and to multiplex the at least two recovered qubit control signals onto one of the plurality of spatially separated qubit-control waveguides. In an embodiment, the quantum computer also includes a plurality of radio frequency multiplexers each configured to receive at least two recovered qubit control signals that are different RF wavelengths from the demodulator and to multiplex the at least two recovered qubit control signals onto a corresponding one of the plurality of spatially separated qubit-control waveguides.

In an embodiment, the radio frequency multiplexer includes a plurality of bandpass filters each allowing a corresponding one recovered qubit control signal to pass while attenuating or substantially blocking all other recovered qubit control signals. In an embodiment, the demodulator includes a direct optical to electrical detector. In an embodiment, the refrigeration system further includes a second temperature-controlled vessel to be controlled at a temperature higher than a temperature in the first-mention temperature-controlled vessel. At least one of the optical multiplexer from the source of the plurality optical carriers, the optical modulator, and the optical multiplexer is disposed in the second temperature-controlled vessel.

In an embodiment, the source of the plurality optical carriers, the optical modulator, and the optical multiplexer are all disposed in the second temperature-controlled vessel. In an embodiment, the refrigeration system further includes a second temperature-controlled to be controlled at a temperature higher than a temperature in the first-mention temperature-controlled vessel. In an embodiment, the optical demultiplexer and at least one demodulator are disposed in the second temperature-controlled vessel. In an embodiment, the optical demultiplexer, and all the demodulators are all disposed in the second temperature-controlled vessel.

Another aspect of the present invention is to provide a method of controlling qubits in a quantum computer. The method includes modulating each of a plurality of qubit control signals onto a respective one of a plurality of optical carriers to provide a plurality of modulated optical signals, each optical carrier of the plurality of optical carriers being a different wavelength of light; multiplexing the plurality of modulated optical signals onto an optical waveguide to provide a wavelength division multiplexed optical signal to be transmitted through the optical waveguide; demultiplexing the plurality of modulated optical signals from the wavelength division multiplexed optical signal after being transmitted through the optical waveguide to recover the plurality of modulated optical signals; demodulating the recovered plurality of modulated optical signals to recover the plurality of qubit control signals; coupling each recovered qubit control signal from the plurality of recovered qubit control signals after the demodulating into at least one of a plurality of spatially separated qubit-control waveguides such that equivalent qubit control signals are spatially divided into different qubit-control waveguides; and directing recovered qubit control signals from each spatially separated qubit-control waveguide to a different subset of a plurality of qubits of the quantum computer to provide control thereof.

In an embodiment, the modulating and the multiplexing are performed at a higher temperature than the demultiplexing, the demodulating, the coupling and the directing. In an embodiment, the plurality of qubits is a plurality of superconducting qubits and at least one of the demultiplexing, the demodulating, the coupling and the directing is performed at an operating temperature of the plurality of superconducting qubits. In an embodiment, each of the plurality of superconducting qubits has a control signal in a radio frequency (RF) spectral range, the qubit-control waveguides being RF waveguides.

In an embodiment, the demultiplexing the plurality of modulated optical signals from the wavelength division multiplexed optical signal includes band-pass filtering the wavelength division multiplexed optical signal for each of a plurality of pass bands to provide a plurality of demultiplexed modulated optical signals at each of a plurality of optical channels.

In an embodiment, the demodulating the plurality of qubit control signals from the plurality of modulated optical signals includes direct optical detection of each of the plurality of demultiplexed modulated optical signals to provide a corresponding plurality of demodulated electrical signals in the RF spectral range.

In an embodiment, the demodulating the plurality of qubit control signals from the plurality of modulated optical signals includes direct optical detection to provide a corresponding plurality of demodulated electrical signals in the RF spectral range. In an embodiment, the demodulating, the coupling and the directing are performed at an operating superconducting temperature of the plurality of qubits.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

In the following paragraphs, the terms "light" and "optical" are intended to be general to include both visible and non-visible portions of the electromagnetic spectrum such as, but not limited to, visible light, infrared light, near infrared light and ultraviolet light. The term "subset of a plurality of qubits" is intended to include any integer number including a single qubit or any plurality of qubits.

Figure 1:
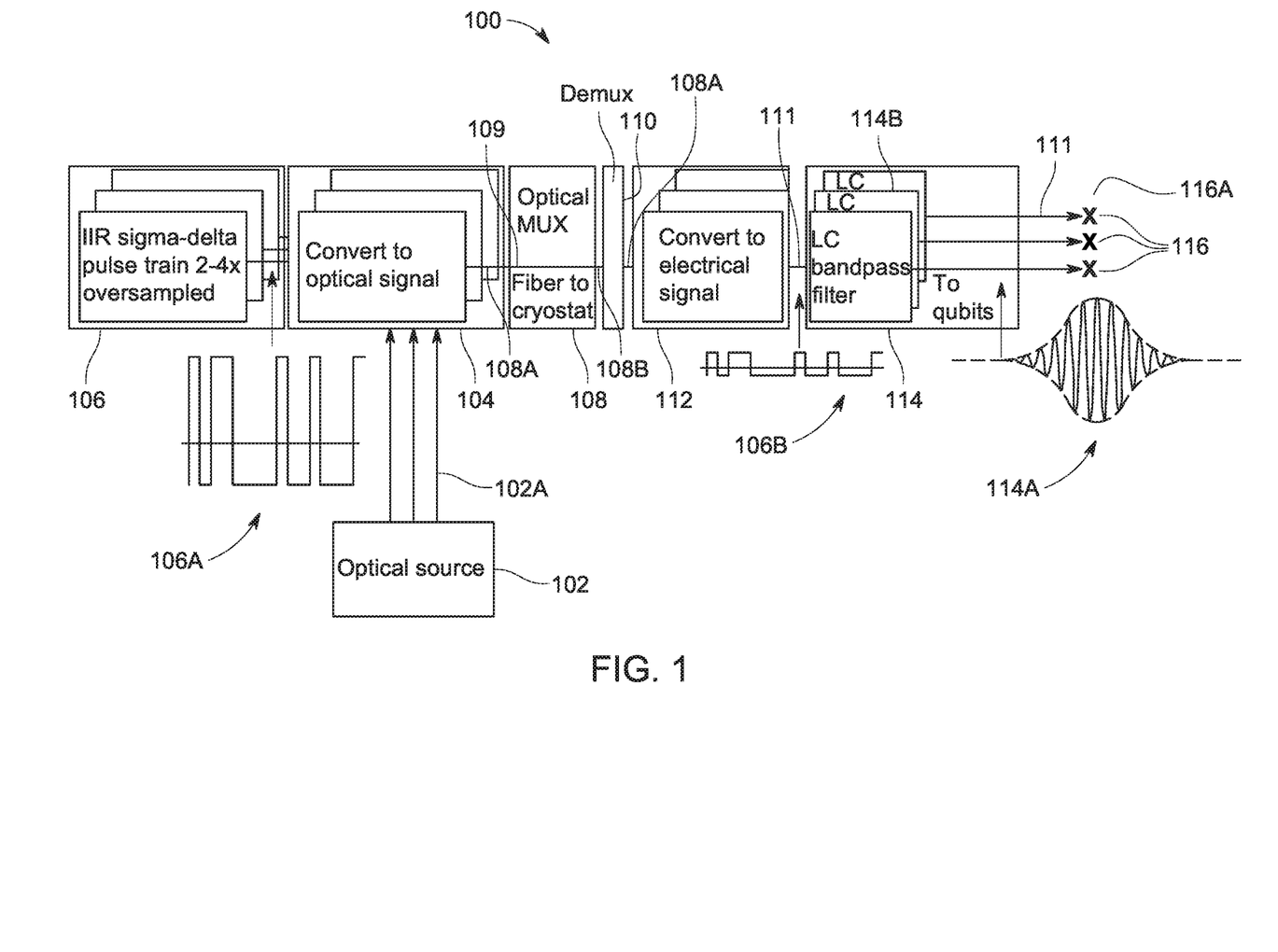
FIG. 1 is schematic diagram of a qubit control system for a quantum computer, according to an embodiment of the present invention.

FIG. 1 is schematic diagram of a qubit control system 100 for a quantum computer (not shown), according to an embodiment of the present invention. The qubit control system 100 includes an optical source 102 of a plurality optical carriers 102A, each optical carrier being a different wavelength of light. In an embodiment, the optical source 102 can include, for example, a plurality of lasers such as Fabry Perot gain medium lasers. For example, lasers having quantum dot active regions can be used to generate appropriately spaced optical wavelengths in a single optical fiber. These sources are suitable for generating a plurality of laser lines (e.g., 8 to 32 laser lines) in a relatively narrow optical wavelength range. For example, a quantum dot-based diode laser operating as an optical frequency comb generator can be used. The quantum dot-based laser can be coupled to an optical fiber to provide for example several low noise 80 GHz spaced optical modes at about, for example, 1310 nm.

The qubit control system 100 also includes an optical modulator 104 configured to receive the plurality optical carriers 102A and to modulate each optical carrier 102A with a qubit control signal 106A generated by a qubit control signal source 106 to provide a plurality of modulated optical signals 108A.

The qubit control system 100 also includes an optical multiplexer (MUX) 108 configured to receive the plurality of modulated optical signals 108A and provide a wavelength division multiplexed optical signal 108B. The qubit control system 100 also includes an optical waveguide 109 optically coupled to the optical multiplexer to receive and transmit the wavelength division multiplexed optical signal therethrough.

The qubit control system 100 further includes an optical demultiplexer (DEMUX) 110 optically coupled to the optical waveguide 109 to receive the wavelength division multiplexed optical signal 108B after being transmitted through the optical waveguide 109 to recover each of the plurality of modulated optical signals 108A.

The qubit control system 100 also includes a demodulator 112 optically coupled to the optical demultiplexer 110 to receive each of the recovered plurality of modulated optical signals 108A to output a corresponding plurality of recovered qubit control signals 106B. In an embodiment, the plurality of recovered qubit control signals 106B are substantially similar or equivalent to the qubit control signal 106A.

The qubit control system 100 further includes a plurality of spatially separated qubit-control waveguides 111 each configured to receive at least one of the plurality of recovered qubit control signals 106B such that equivalent recovered qubit control signals 106B are spatially divided into different spatially separated qubit-control waveguides 111.

The qubit control system 100 is configured to control a plurality of qubits 116 by qubit control signals 106A delivered by the plurality of spatially separated qubit-control waveguides 111. Each of the plurality of spatially separated qubit-control waveguides 111 directs qubit control signals 106B to a different subset 116A of the plurality of qubits 116. Although a single qubit is shown as being the subset of qubits 116A of the plurality of qubits 116, it must be appreciated that one, two or more can form the subset of qubits 116A of the plurality of qubits 116.

In an embodiment, the qubit control system 100 further includes a radio frequency multiplexer/demultiplexer 114 including one or more bandpass filters 114B configured to receive the plurality of recovered qubit control signals 106B transmitted via the spatially separated qubit-control waveguides 111 and output frequency filtered recovered qubit control signals 114A which are used to control the corresponding subset 116A of the plurality of qubits 116.

In an embodiment, the plurality of qubit control signals 106A and corresponding plurality of recovered qubit control signals 106B are in radio frequency (RF) wavelength ranges corresponding to an excitation energy of a corresponding qubit 116A to be controlled.

In an embodiment, the qubit control system 100 further includes the radio frequency multiplexer/demultiplexer 114 configured to receive at least two recovered qubit control signals 106B that are different RF wavelengths from the demodulator 112 and to multiplex the at least two recovered qubit control signals 106B onto one of the plurality of spatially separated qubit-control waveguides 111.

In an embodiment, the qubit control system 100 also includes a plurality of radio frequency multiplexers/demultiplexers 114, each radiofrequency multiplexer/demultiplexer 114 is configured to receive at least two recovered qubit control signals 106B that are different RF wavelengths from the demodulator 112 and to multiplex the at least two recovered qubit control signals 106B onto a corresponding one of the plurality of spatially separated qubit-control waveguides 111.

In an embodiment, the radio frequency multiplexer 114 includes a plurality of bandpass filters 114B, each of the plurality of bandpass filters 114B allowing a corresponding one of the recovered qubit control signals 106B to pass while attenuating or substantially blocking all other recovered qubit control signals 106B. In an embodiment, each bandpass filter 114B can include a LC circuit to provide a LC bandpass filter.

In an embodiment, the demodulator 112 includes a direct optical to electrical converter. In an embodiment, the optical to electrical converter can include for example an optical detector or photodetector such as a photodiode, a photomultiplier, or a bolometric scale (SC).

Figure 2:
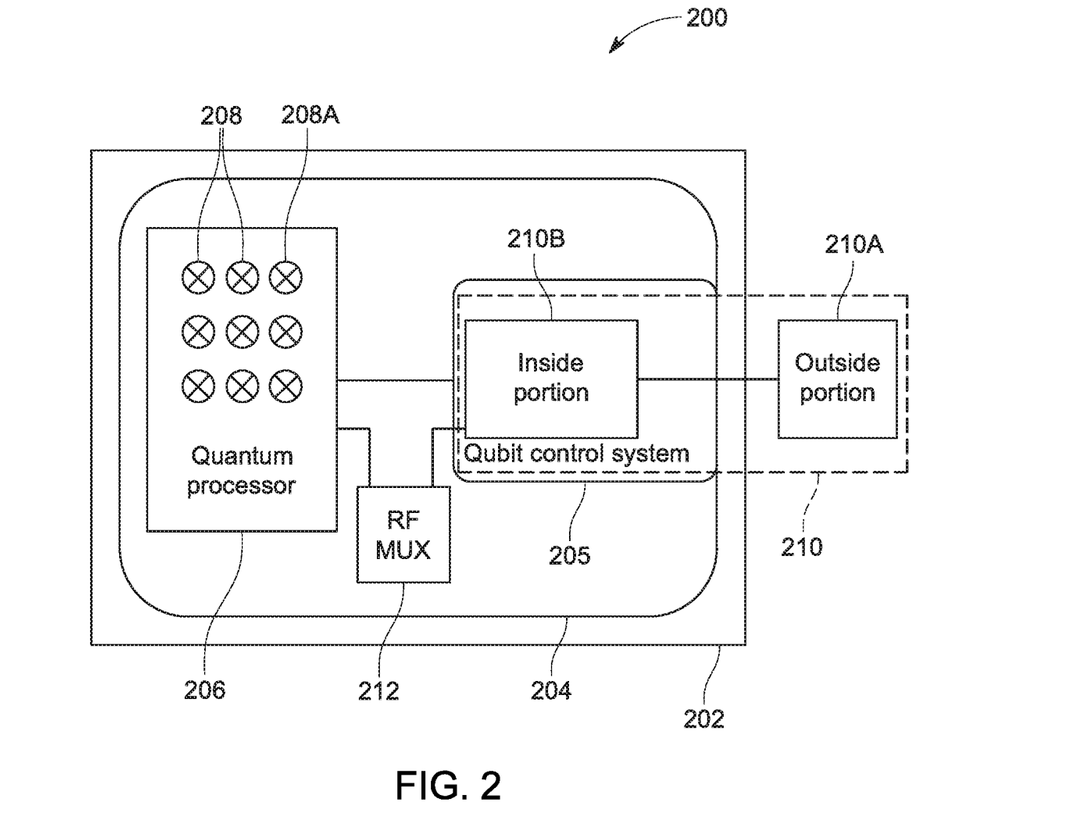
FIG. 2 is a schematic diagram of the quantum computer, according to an embodiment of the present invention.

Another aspect of the present invention is to provide a quantum computer 200. FIG. 2 is a schematic diagram of the quantum computer, according to an embodiment of the present invention. The quantum computer 200 includes a refrigeration system 202 including a temperature-controlled vessel 204 and a quantum processor 206 disposed within the temperature-controlled vessel 204. The quantum processor 206 includes a plurality of qubits 208. The quantum computer 200 also includes a qubit control system 210 having a portion 210A exterior to the temperature-controlled vessel 204 and a portion 210B extending into the temperature-controlled vessel 204 to provide control of the plurality of qubits 208.

The qubit control system 210 is similar to the qubit control system 100 described in the above paragraphs with respect to FIG. 1. Therefore, in referring to components of the qubit control system 210, similar components of the qubit control system 100 are referred to instead. Therefore, further referring to FIG. 1, the qubit control system 210 includes the optical source 102 of a plurality optical carriers 102A, each optical carrier 102A being a different wavelength of light. The qubit control system 210 also includes the optical modulator 104 configured to receive the plurality optical carriers 102A and to modulate each optical carrier 102A with a qubit control signal 106A to provide the plurality of modulated optical signals 108A.

The qubit control system 210 also has an optical multiplexer 108 configured to receive the plurality of modulated optical signals 108A and provide the wavelength division multiplexed optical signal 108B. The qubit control system 210 also includes the optical waveguide 109 optically coupled to the optical multiplexer to receive and transmit the wavelength division multiplexed optical signal therethrough.

The qubit control system 210 further includes an optical demultiplexer 110 optically coupled to the optical waveguide 109 to receive the wavelength division multiplexed optical signal 108B after being transmitted through the optical waveguide 109 to recover each of the plurality of modulated optical signals 108A.

The qubit control system 210 also includes the demodulator 112 optically coupled to the optical demultiplexer 110 to receive each of the recovered plurality of modulated optical signals 108A to output corresponding plurality of recovered qubit control signals 106B.

The qubit control system 100 further includes the plurality of spatially separated qubit-control waveguides 111 each configured to receive at least one of the plurality of recovered qubit control signals 106B such that equivalent recovered qubit control signals 106B are spatially divided into different spatially separated qubit-control waveguides 111.

The plurality of qubits 208 are configured to be controlled by qubit control signals delivered by the plurality of spatially separated qubit-control waveguides. Each of the plurality of spatially separated qubit-control waveguides 111 directs qubit control signals to a different subset 208A of the plurality of qubits 208. In an embodiment, each of the plurality of spatially separated qubit-control waveguides 111 directs qubit control signals to a different subset of the plurality of qubits 208.

In an embodiment, the optical source 102 of the plurality optical carriers 102A, the optical modulator 104, and the optical multiplexer 108 are all disposed external to the temperature-controlled vessel 204. In an embodiment, the optical demultiplexer 110 and the demodulator 112 are disposed within the temperature-controlled vessel 204. The optical waveguide 109 extends from the optical multiplexer 108 that is disposed external to the temperature-controlled vessel 204 into the temperature-controlled vessel 204 to the optical demultiplexer 110.

In an embodiment, the plurality of qubit control signals 106A and corresponding the plurality of recovered qubit control signals 106B are in radio frequency (RF) wavelength ranges corresponding to an excitation energy of a corresponding qubit 208A to be controlled.

In an embodiment, the quantum computer 200 further includes a radio frequency multiplexer 212 configured to receive at least two recovered qubit control signals 106B that are different RF wavelengths from the demodulator 112 and to multiplex the at least two recovered qubit control signals 106B onto one of the plurality of spatially separated qubit-control waveguides 111. The radiofrequency multiplexer 212 can be similar to the radiofrequency multiplexer 114 shown in FIG. 1 and described in the above paragraphs.

The quantum computer 200 further includes a plurality of radio frequency multiplexers 212, each configured to receive at least two recovered qubit control signals 106B that are different RF wavelengths from the demodulator 112 and to multiplex the at least two recovered qubit control signals 106B onto a corresponding one of the plurality of spatially separated qubit-control waveguides 111.

In an embodiment, the radio frequency multiplexer 212 includes a plurality of bandpass filters such as bandpass filters 114B of radio frequency multiplexer 114, each of the plurality of bandpass filters allowing a corresponding one of the recovered qubit control signals 106B to pass while attenuating or substantially blocking all other recovered qubit control signals 106B. In an embodiment, the bandpass filter can include a LC circuit to form a LC bandpass filter.

In an embodiment, the refrigeration system 202 further includes a second temperature-controlled vessel 205 to be controlled at a temperature higher than a temperature in the first-mention temperature-controlled vessel 204. In an embodiment, the interior portion 210B of the qubit control system 210 includes the optical multiplexer 108, the optical modulator 104, and the optical demultiplexer 110 and is disposed in the second temperature-controlled vessel 205.

In another embodiment, the optical source 102 of the plurality optical carriers 102A, the optical modulator 104, and the optical multiplexer 108 can also be disposed in the second temperature-controlled vessel 205. In an embodiment, the second temperature-controlled vessel 205 is controlled at a temperature higher than a temperature in the first-mention temperature-controlled vessel 204 where the quantum processor 206 is located. In an embodiment, the optical demultiplexer 110 and at least one demodulator 112 can also be disposed in the second temperature-controlled vessel 205 instead of the first-mention temperature-controlled vessel 204. In an embodiment, the optical demultiplexer 110, and the demodulator 112 are all disposed in the second temperature-controlled vessel 205.

Although the second temperature-controlled vessel 205 is shown inside the first-mentioned temperature-controlled vessel 204, the second temperature-controlled vessel 205 can also be located outside the first-mentioned temperature-controlled vessel 204. In addition, in another embodiment, the second temperature-controlled vessel 205 can also be a portion or zone of the first mentioned temperature-controlled vessel 204 where the temperature is higher than a portion or zone of the first mentioned temperature-controlled vessel 204 where the quantum processor 206 is located or disposed. In an embodiment, the quantum processor 206 and associated qubits 208, 116 operate at superconducting temperatures and therefore, the qubits 116 and 208 are superconducting qubits.

In other embodiments, more than two temperature control vessels can be used without limitation as to the particular number. Furthermore, components of the qubit control system can be arranged in many ways distributed among the more than two temperature control vessel in various embodiments.

One benefit of using such a qubit control system 100, 210 is the ability to provide more signals/fiber than is possible when using multiplexed signals radio frequency (RF) coax because wavelength division multiplexing (WDM) allows same modulation frequency RF to be transmitted on different optical wavelengths. Another benefit is that high-frequency Finite Impulse Response (FIR) and Infinite Impulse Response (IIR) modulation can be performed at room temperature in the optical domain or in an environment where the temperature is higher than a temperature of the quantum processor/qubits are located. Another benefit is that the relatively small signal path at low-temperature for the signals before being filtered enables the elimination of active electronics in cryostat thus reducing heat dissipation. Instead, a passive LC filter, photodetector/converter can be used within the cryostat.

Figure 3:
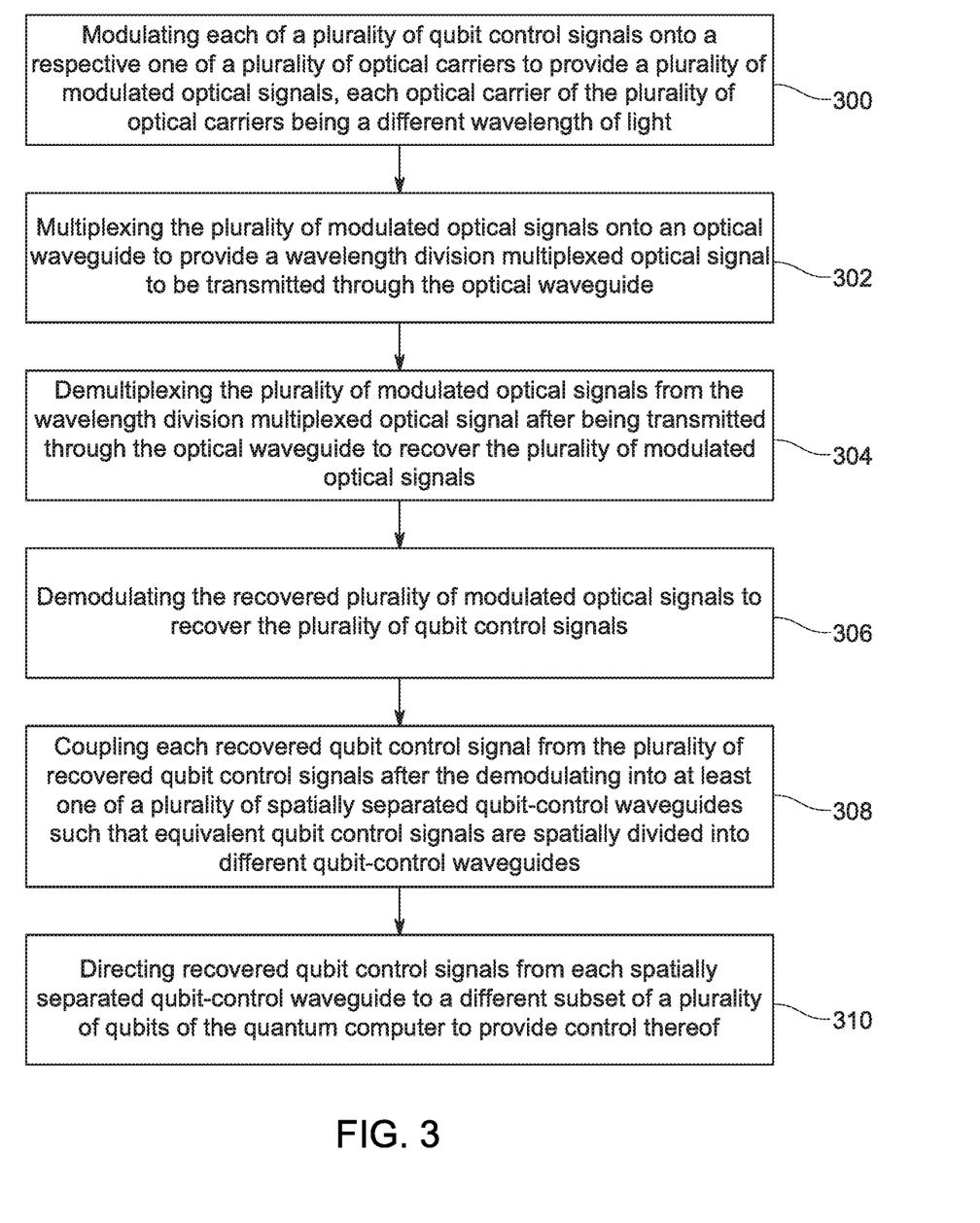
FIG. 3 is a flow chart of a method of controlling qubits in a quantum computer, according to an embodiment of the present invention.

Another aspect of the present invention is to provide a method of controlling qubits in a quantum computer. FIG. 3 is a flow chart of a method of controlling qubits in a quantum computer, according to an embodiment of the present invention. The method includes modulating each of a plurality of qubit control signals onto a respective one of a plurality of optical carriers to provide a plurality of modulated optical signals, each optical carrier of the plurality of optical carriers being a different wavelength of light, at 300; multiplexing the plurality of modulated optical signals onto an optical waveguide to provide a wavelength division multiplexed optical signal to be transmitted through the optical waveguide, at 302; demultiplexing the plurality of modulated optical signals from the wavelength division multiplexed optical signal after being transmitted through the optical waveguide to recover the plurality of modulated optical signals, at 304; demodulating the recovered plurality of modulated optical signals to recover the plurality of qubit control signals, at 306; coupling each recovered qubit control signal from the plurality of recovered qubit control signals after the demodulating into at least one of a plurality of spatially separated qubit-control waveguides such that equivalent qubit control signals are spatially divided into different qubit-control waveguides, at 308; and directing recovered qubit control signals from each spatially separated qubit-control waveguide to a different subset of a plurality of qubits of the quantum computer to provide control thereof, at 310.

In an embodiment, the modulating and the multiplexing are performed at a higher temperature than the demultiplexing, the demodulating, the coupling and the directing. In an embodiment, the plurality of qubits is a plurality of superconducting qubits and at least one of the demultiplexing, the demodulating, the coupling and the directing is performed at an operating temperature of the plurality of superconducting qubits. In an embodiment, each of the plurality of superconducting qubits has a control signal in a radio frequency (RF) spectral range, the qubit-control waveguides being RF waveguides.

In an embodiment, demultiplexing the plurality of modulated optical signals from the wavelength division multiplexed optical signal includes band-pass filtering the wavelength division multiplexed optical signal for each of a plurality of pass bands to provide a plurality of demultiplexed modulated optical signals at each of a plurality of optical channels.

In an embodiment, the demodulating the plurality of qubit control signals from the plurality of modulated optical signals includes direct optical detection of each of the plurality of demultiplexed modulated optical signals to provide a corresponding plurality of demodulated electrical signals in the RF spectral range.

In an embodiment, the demodulating the plurality of qubit control signals from the plurality of modulated optical signals includes direct optical detection to provide a corresponding plurality of demodulated electrical signals in the RF spectral range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A qubit control system for a quantum computer, comprising:
    a source of a plurality optical carriers, each optical carrier being a different wavelength of light;
    an optical modulator configured to receive said plurality optical carriers and to modulate each optical carrier with a qubit control signal to provide a plurality of modulated optical signals;
    an optical multiplexer configured to receive said plurality of modulated optical signals and provide a wavelength division multiplexed optical signal;
    an optical waveguide optically coupled to said optical multiplexer to receive and transmit said wavelength division multiplexed optical signal therethrough;
    an optical demultiplexer optically coupled to said optical waveguide to receive said wavelength division multiplexed optical signal after being transmitted through said optical waveguide to recover each of said plurality of modulated optical signals;
    a demodulator optically coupled to said optical demultiplexer to receive each of said recovered plurality of modulated optical signals to output a corresponding plurality of recovered qubit control signals;
    a plurality of spatially separated qubit-control waveguides each configured to receive at least one of said plurality of recovered qubit control signals such that equivalent recovered qubit control signals are spatially divided into different spatially separated qubit-control waveguides,
    wherein each of said plurality of spatially separated qubit-control waveguides directs qubit control signals to a different subset of a plurality of qubits, the plurality of qubits being configured to be controlled by the qubit control signals delivered by said plurality of spatially separated qubit-control waveguides.

2. The qubit control system according to claim 1, wherein said plurality of qubit control signals and corresponding said plurality of recovered qubit control signals are in radio frequency (RF) wavelength ranges corresponding to an excitation energy of a corresponding qubit to be controlled.

3. The qubit control system according to claim 2, further comprising a radio frequency multiplexer configured to receive at least two recovered qubit control signals that are different RF wavelengths from said demodulator and to multiplex said at least two recovered qubit control signals onto one of said plurality of spatially separated qubit-control waveguides.

4. The qubit control system according to claim 2, further comprising a plurality of radio frequency multiplexers each configured to receive at least two recovered qubit control signals that are different RF wavelengths from said demodulator and to multiplex said at least two recovered qubit control signals onto a corresponding one of said plurality of spatially separated qubit-control waveguides.

5. The qubit control system according to claim 1, wherein said radio frequency multiplexer comprises a plurality of bandpass filters each allowing a corresponding one recovered qubit control signal to pass while attenuating or substantially blocking all other recovered qubit control signals.

6. The qubit control system according to claim 1, wherein said demodulator comprises a direct optical to electrical converter.

7. A quantum computer comprising:
    a refrigeration system comprising a temperature-controlled vessel;
    a quantum processor disposed within said temperature-controlled vessel, said quantum processor comprising a plurality of qubits; and
    a qubit control system having a portion exterior to said temperature-controlled vessel and a portion extending into said temperature-controlled vessel to provide control of said plurality of qubits,
    wherein said qubit control system comprises:
        a source of a plurality optical carriers, each optical carrier being a different wavelength of light;

an optical modulator configured to receive said plurality optical carriers and to modulate each optical carrier with a qubit control signal to provide a plurality of modulated optical signals;

an optical multiplexer configured to receive said plurality of modulated optical signals and provide a wavelength division multiplexed optical signal;

an optical waveguide optically coupled to said optical multiplexer to receive and transmit said wavelength division multiplexed optical signal therethrough;

an optical demultiplexer optically coupled to said optical waveguide to receive said wavelength division multiplexed optical signal after being transmitted through said optical waveguide to recover each of said plurality of modulated optical signals;

a demodulator optically coupled to said optical demultiplexer to receive each of said recovered plurality of modulated optical signals to output a corresponding plurality of recovered qubit control signals;

a plurality of spatially separated qubit-control waveguides each configured to receive at least one of said plurality of recovered qubit control signals such that equivalent recovered qubit control signals are spatially divided into different spatially separated qubit-control waveguides, wherein each of said plurality of spatially separated qubit-control waveguides directs qubit control signals to a different subset of the plurality of qubits, the plurality of qubits being configured to be controlled by the qubit control signals delivered by said plurality of spatially separated qubit-control waveguides.

8. The quantum computer according to claim 7, wherein said source of said plurality optical carriers, said optical modulator, and said optical multiplexer are all disposed external to said temperature-controlled vessel, wherein said optical demultiplexer and said demodulator are disposed within said temperature-controlled vessel, and wherein said optical waveguide extends from said optical multiplexer that is disposed external to said temperature-controlled vessel into said temperature-controlled vessel to said optical demultiplexer.

9. The quantum computer according to claim 8, wherein said plurality of qubit control signals and corresponding said plurality of recovered qubit control signals are in radio frequency (RF) wavelength ranges corresponding to an excitation energy of a corresponding qubit to be controlled.

10. The quantum computer according to claim 9, further comprising a radio frequency multiplexer configured to receive at least two recovered qubit control signals that are different RF wavelengths from said demodulator and to multiplex said at least two recovered qubit control signals onto one of said plurality of spatially separated qubit-control waveguides.

11. The quantum computer according to claim 9, further comprising a plurality of radio frequency multiplexers each configured to receive at least two recovered qubit control signals that are different RF wavelengths from said demodulator and to multiplex said at least two recovered qubit control signals onto a corresponding one of said plurality of spatially separated qubit-control waveguides.

12. The quantum computer according to claim 11, wherein said radio frequency multiplexer comprises a plurality of bandpass filters each allowing a corresponding one recovered qubit control signal to pass while attenuating or substantially blocking all other recovered qubit control signals.

13. The quantum computer according to claim 8, wherein said demodulator comprises a direct optical to electrical detector.

14. The quantum computer according to claim 8, wherein said refrigeration system further comprises a second temperature-controlled vessel to be controlled at a temperature higher than a temperature in the first-mention temperature-controlled vessel, and wherein at least one of said optical multiplexer from said source of said plurality optical carriers, said optical modulator, and said optical multiplexer is disposed in said second temperature-controlled vessel.

15. The quantum computer according to claim 14, wherein said source of said plurality optical carriers, said optical modulator, and said optical multiplexer are all disposed in said second temperature-controlled vessel.

16. The quantum computer according to claim 8, wherein said refrigeration system further comprises a second temperature-controlled to be controlled at a temperature higher than a temperature in the first-mention temperature-controlled vessel, and wherein said optical demultiplexer and at least one demodulator is disposed in said second temperature-controlled vessel.

17. The quantum computer according to claim 16, wherein said optical demultiplexer, and all said demodulators are all disposed in said second temperature-controlled vessel.

18. A method of controlling qubits in a quantum computer, comprising:

modulating each of a plurality of qubit control signals onto a respective one of a plurality of optical carriers to provide a plurality of modulated optical signals, each optical carrier of said plurality of optical carriers being a different wavelength of light;

multiplexing said plurality of modulated optical signals onto an optical waveguide to provide a wavelength division multiplexed optical signal to be transmitted through said optical waveguide;

demultiplexing said plurality of modulated optical signals from said wavelength division multiplexed optical signal after being transmitted through said optical waveguide to recover said plurality of modulated optical signals;

demodulating said recovered plurality of modulated optical signals to recover said plurality of qubit control signals;

coupling each recovered qubit control signal from said plurality of recovered qubit control signals after said demodulating into at least one of a plurality of spatially separated qubit-control waveguides such that equivalent qubit control signals are spatially divided into different qubit-control waveguides; and directing recovered qubit control signals from each spatially separated qubit-control waveguide to a different subset of a plurality of qubits of said quantum computer to provide control thereof.

19. The method according to claim 18, wherein said modulating and said multiplexing are performed at a higher temperature than said demultiplexing, said demodulating, said coupling and said directing.

20. The method according to claim 18, wherein said plurality of qubits is a plurality of superconducting qubits and at least one of said demultiplexing, said demodulating, said coupling and said directing is performed at an operating temperature of said plurality of superconducting qubits.

21. The method according to claim 19, wherein each of said plurality of superconducting qubits has a control signal in a radio frequency (RF) spectral range, said qubit-control waveguides being RF waveguides.

22. The method according to claim 20, wherein said demultiplexing said plurality of modulated optical signals from said wavelength division multiplexed optical signal comprises band-pass filtering said wavelength division multiplexed optical signal for each of a plurality of pass bands to provide a plurality of demultiplexed modulated optical signals at each of a plurality of optical channels.

23. The method according to claim 21, wherein said demodulating said plurality of qubit control signals from said plurality of modulated optical signals comprises direct optical detection of each of said plurality of demultiplexed modulated optical signals to provide a corresponding plurality of demodulated electrical signals in said RF spectral range.

24. The method according to claim 22, wherein said demodulating said plurality of qubit control signals from said plurality of modulated optical signals comprises direct optical detection to provide a corresponding plurality of demodulated electrical signals in said RF spectral range.

25. The method according to claim 21, wherein said demodulating, said coupling and said directing are performed at an operating superconducting temperature of said plurality of qubits.

\* \* \* \* \*